C. H. HAKENDORF.
INDICATOR FOR USE IN TRANSCRIBING MUSIC.
APPLICATION FILED JAN. 4, 1911.
997,995.
Patented July 18, 1911.
— FIG 1 —
— FIG 2 —
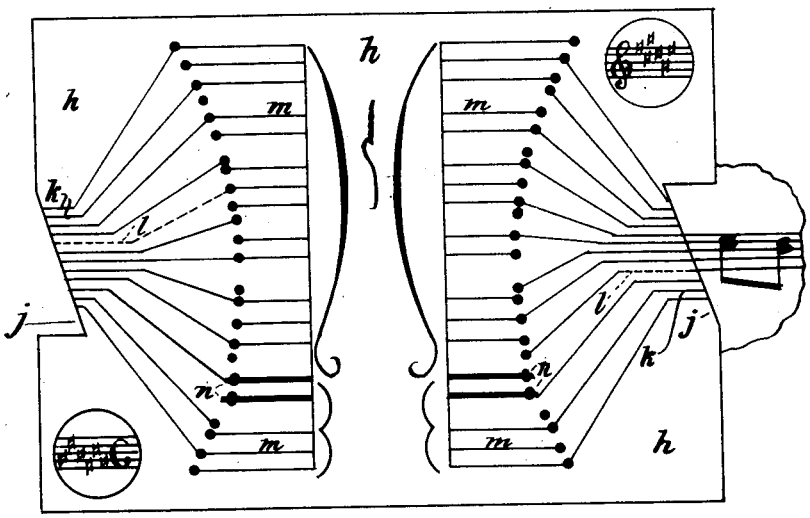
— FIG 3 —
Witnesses:—
Edw. S. DuBois
M. L. Hendricken
Inventor
Christopher Henry Hakendorf
by
his Attorney

UNITED STATES PATENT OFFICE.

CHRISTOPHER HENRY HAKENDORF, OF UNLEY, SOUTH AUSTRALIA, AUSTRALIA.

INDICATOR FOR USE IN TRANSCRIBING MUSIC.

997,995. Specification of Letters Patent. Patented July 18, 1911.

Application filed January 4, 1911. Serial No. 600,757.

*To all whom it may concern:*

Be it known that I, CHRISTOPHER HENRY HAKENDORF, a subject of His Majesty the King of Great Britain, residing at Unley Road, Unley, in the State of South Australia, Australia, have invented new and useful Improvements in Indicators for Use in Transcribing Music, of which the following is a specification.

My invention relates to improvements in indicators for use in transcribing music, and is more particularly applicable for use in transcribing music written in the ordinary notation into music written in the system employing staff lines arranged in groups of threes and twos corresponding to the groups of black keys on a piano key board.

I will now proceed to describe my invention by aid of the accompanying illustrative drawings, in connection with which I will also briefly describe the underlying principle of the group line system.

In the drawings—Figure 1 represents a few bars of music written in the ordinary notation, Fig. 2 represents the group line staff, Fig. 3 illustrates my indicator, showing portion of Fig. 1 applied thereto.

In the various illustrations letters of reference are used to denote corresponding parts wherever the context admits.

In the illustration of the indicator shown in Fig. 3 the indicating lines and positions of the notes are arranged for music written in six sharps, being the key generally recognized as the most difficult to deal with, and in that respect corresponding with the notation set out in Fig. 1, but it is to be understood that the whole of the keys can be worked out by means of separate indicators on the principles hereinafter described, a separate indicator being used for each key.

The general system of writing music by means of staffs primarily composed of five parallel lines arranged equidistantly apart is already well known and will not require detailed description.

Referring to Fig. 2 of the drawings the parallel lines thereon represented indicate the position of the notes on a piano, but it will be observed that the parallel lines are not equidistant but are placed in groups of two and three lines respectively. These lines also represent the black keys of the piano. The two middle lines which are ruled somewhat thicker than the others are marked $c$ and $d$ and represent the middle C# and D# on the keyboard of the instrument. At the top of the staff shown in Fig. 2 the lines $c$ and $d$ are repeated and correspond with the two black notes on the right hand side of the instrument, viz.—C# and D# above the center. These lines are again repeated at the bottom of the staff, and reading downward represent D# and C# on the left hand side of the center of the instrument. The intermediate groups of three lines placed above and below the two center lines represent the groups of black keys correspondingly situated, and reading up from the center the lines marked $f$, $g$, $a$ denote the center the lines marked $f$, $g$, $a$ denote the black keys F# G# A#, while those below the center marked $a$, $g$, $f$ likewise represent the black keys A# F# G# on the left hand side of the center of the instrument. The spaces adjacent to and between the black lines represent the position of the white keys or naturals on the instrument, thus C natural will be written immediately below the lower black line marked $c$ and is indicated in the drawing by the reference circle $x$. D natural which in the instrument lies between the two black keys is likewise indicated in the drawing by the reference circle $y$, and the note E which on the instrument is immediately above the black key is indicated by the reference circle $z$. The note F natural would be written in Fig. 2 immediately above and adjacent to the reference circle $z$ which represents E, that is to say, it would be written immediately beneath the line marked $f$ corresponding with its actual position on the piano keyboard. Other notes are placed in their positions on the same principle as will be well understood.

Referring now to Fig. 1 which represents ordinary notation, and for the sake of brevity, I have placed a reference circle $c$ in the treble clef and have marked the same with the letter $x$, and in the bass clef I have also marked a reference circle $x$ to indicate the position of the note $c$ but it will be observed that so far as the staff is concerned the relative position of the notes vary in the bass and treble, thus causing difficulty and confusion to beginners when endeavoring to transcribe one system to another.

My improved indicator which is more particularly illustrated in Fig. 3 affords a ready means for transcription and I will now proceed to describe an indicator arranged to suit music written in six sharps, it being understood that a separate indicator is used for each key in which the music is written. The indicator is formed from a sheet of cardboard, aluminium, celluloid or other suitable material $h$ and is provided with a diagonally cut edge $j$. From the edge of the diagonal cut a series of evenly spaced parallel lines $k$ are drawn, the distance between each line being equal to the average distance of the parallel lines in ordinary musical notation. I prefer to form my indicator in such a manner that both the bass and treble are arranged upon the same card or sheet as in Fig. 3 of the drawings. In each instance one of the equidistant parallel lines is dotted, colored, embossed or otherwise rendered distinctive and is marked $l$ in the illustration to indicate the corresponding bottom line of the five equidistant lines used in ordinary notation. Opposite to the equidistant parallel lines another series of lines is formed marked $m$ in the illustration, but are not equidistant, their position being arranged to correspond with the black notes on the piano or other similar instrument, thus corresponding in arrangement with the lines in Fig. 2 of the drawings. On the indicator two lines rendered distinctive from the others are shown at $n$ to indicate what may be termed the middle notes of the piano keyboard. These several unequally spaced lines $m$ are joined where necessary by means of curved, diagonal or radiating lines to the series of lines marked $k$, thus bringing the ordinary notation ruling and the group line system ruling into contact with each other so that the indicator may be used for the transcription of music in the following manner: If it is desired to transcribe the first two notes of Fig. 1 into their relative position on the group line system staff the treble portion of the indicator (which is marked with a treble sign and key signature) is placed with its diagonal edge adjacent to the notes to be so transcribed on the treble clef so that the dotted line $l$ is in alinement with the bottom line of the staff. It will be seen that the first two notes are E and C, and as the music is written in six sharps both of these notes will be sharps. Tracing their relative position by means of the indicator to the series of lines $m$ it will be seen that the upper note which is E♯ will lie in the space between the group of two and group of three black lines, or in other words, it assumes the position of F natural and will be written immediately beneath and adjacent to the bottom line of the group of three black lines on the group line system staff. It will, however, be noted that it is not to be written close to the black lines of the group of two lines in the indicator or on the group line system staff, but in an octave above the position where the black lines occur, and for this reason a repetition of the staff upward is made by introducing a group of three lines as leger lines above the staff, and I have marked the note in the position required as indicated by the reference letter $o$ at the top of Fig. 2 as will be well understood, leger lines being used for treble or bass clefs as circumstances may require. The other note is C♯ and can be traced by means of the indicator to its proper position, viz.—upon the lower black line of the group of two black lines in the group line system which I have shown in Fig. 2 by the reference letter $p$. The next note in the treble clef of the ordinary notation is D♯ and when traced by the indicator its position is readily found upon the upper one of a group of two black lines, and I have indicated its position in Fig. 2 by the reference letter $q$. In order to obtain the first note of the bass clef which is G♯ the indicator is reversed so that the dotted line in the bass clef of the series of lines $k$ falls on the bottom line in the ordinary notation, and its position on the indicator will be traced to the middle note of the group of three black lines, which is G♯ on the instrument and will be written on the group line system as shown by the reference letter $r$, which being in the octave below the middle notes of the piano is necessarily written upon leger lines placed below the staff. The relative transcribed position of all other notes will be found in the same manner, except in cases of accidentals. For instance, if in the music shown in Fig. 1 a C natural or E natural were introduced their position on the group line system staff could be found from the position shown in a key of C indicator wherein all the notes are naturals, and C and E would appear between lines instead of being intersected with lines.

It is well known that in ordinary music the distance apart from each other of the parallel lines forming the staff vary considerably, music being written in both large score and small score. My indicator is formed with a diagonal edge so as to render it applicable to the varying gages of the print, as it will be clear that by holding the card at an angle the diagonal portion $j$ can be made to lie at right angles to the staff lines or obliquely across the same, thereby causing the parallel lines $k$ to register with the ordinary notation lines whether the latter be ruled wide apart or close together.

The position of the line $l$ may be indicated by dots as shown in the drawing or may be specially embossed, recessed or slotted so that it may readily be distinguished from the others in the series of parallel lines to enable the relative position of the bottom line in ordinary notation to be easily ascertained.

Having now fully described and ascer- tained my said invention and the manner in which it is to be performed I declare that what I claim is:—

1. An indicator chart for use in transcribing music, having a series of equidistant lines marked thereon delineated to correspond with the ruling of ordinary music staff notation, and a series of lines marked in groups, respectively, of two and three corresponding to the black keys of a piano or other similar instrument, and a series of diagonal, radiating lines, which join the equidistant lines to the key lines.

2. An indicator chart for use in transcribing music, having a series of lines marked thereon delineated to correspond with the ruling of ordinary music staff notation, lines arranged in groups representing the black keys of a piano or other similar instrument, diagonal, radiating lines connecting the first mentioned series of lines with the group lines, and a distinguishing mark to indicate the position of the bottom line of ordinary notation relatively to the lines on the indicator.

3. An indicator chart for use in transcribing music having a diagonally cut edge, and having also proceeding from said edge a series of equidistant lines marked thereon delineated to correspond with the ruling of ordinary music staff notation, a series of lines marked in groups, respectively, of two and three corresponding to the black keys of a piano or other similar instrument, and a series of diagonal, radiating lines, which join the equidistant lines to the key lines.

In testimony whereof I have signed my name to this specification in the presence of two subscribing witnesses.

CHRISTOPHER HENRY HAKENDORF.

Witnesses:
JOHN HERBERT COOKE,
JAMES TINGEY.

Copies of this patent may be obtained for five cents each, by addressing the "Commissioner of Patents, Washington, D. C."